US005818518A

United States Patent [19]

Wordsworth et al.

[11] Patent Number: 5,818,518

[45] Date of Patent: Oct. 6, 1998

[54] FILM TRANSFER APPARATUS

[75] Inventors: Gary Bryan Wordsworth, Bucks; Stephen Sherlock, Woking; David Christopher Kneller, Bucks, all of United Kingdom; David Llyod Schnuelle, Westlake Village, Calif.

[73] Assignee: Innovision Limited, Surrey, United Kingdom

[21] Appl. No.: 724,001

[22] Filed: Sep. 30, 1996

[30] Foreign Application Priority Data

Jul. 5, 1996 [GB] United Kingdom .................. 9614147

[51] Int. Cl.[6] ............................ H04N 5/253; H04N 3/36; H04N 3/38; H04N 3/40

[52] U.S. Cl. ............................ 348/106; 348/96; 348/100

[58] Field of Search ............................... 348/96, 97, 100, 348/103, 106; H04N 3/36, 3/38, 3/40, 5/253, 5/257

[56] References Cited

U.S. PATENT DOCUMENTS 5,179,314 1/1993 Walker et al. .......................... 348/106
5,448,372 9/1995 Axman ...................................... 348/96
5,467,412 11/1995 Capitant .................................... 348/97
5,604,533 2/1997 Eiberger .................................... 348/97

FOREIGN PATENT DOCUMENTS 2 200 508 8/1988 United Kingdom .

*Primary Examiner*—Howard W. Britton
*Attorney, Agent, or Firm*—Young & Thompson

[57] ABSTRACT

An apparatus for use in a method for scanning an image on a film and generating a video signal therefrom. The apparatus having a signal processor (10) receiving a plurality of input raster lines representing a film image, and a control unit (11) having controls (14) operating on said signal processor, whereby the number of the input raster lines used by the signal processor in the active raster to generate said output signal is variable. A signal representing a sequentially scanned image is supplied to filter (12) which performs an anti-aliasing and a decimation process. The amount of oversampling can be varied depending on various factors, such as film speed, and degree of anti-aliasing and aperture correction so as to optimize performance and, in CRT-based systems so as to maintain the size of the raster on the face of the CRT above a predetermined minimum.

19 Claims, 5 Drawing Sheets

FILM TRANSFER APPARATUS

FIELD OF THE INVENTION

The invention relates to an apparatus for converting the images on a movie film to an electronic television (video) signal such as a telecine apparatus.

BACKGROUND OF THE INVENTION

Telecine apparatus are known and FIG. 8 shows a block diagram of a conventional telecine device. The apparatus includes a CRT (cathode ray tube) 1 or other means such as a CCD (charge coupled device) array which is used to scan the film 2. A CCD array may be a line (1D) or area (2D) array. In a "flying spot" CRT-based telecine machine, the film 2 is drawn past the face of the CRT 1 at a constant speed. A spot of light is produced on the face of the CRT and directed by a scan generator or deflection apparatus 3. The dot is directed across the face of the CRT in such a manner that relative to the moving film it traces out a sequential raster, conventionally from left to right across the image and from top to bottom.

The light from this "flying spot" is split into its, blue, green and red components by optical means 4 and the amplitudes of the three components are detected by PECs (photo-electric cells) 5. It is then amplified and converted to digital signals in an analog processing unit 6. A digital memory 7 is used to store this sequential frame representing the image and it is subsequently converted to the required video output by converter 8. The output of converter 8 is in the form of two interlaced fields, each containing every other line from the sequential raster.

A number of problems are associated with these conventional telecine machines. In particular, two problems occur when the speed of the film past the front of the CRT is close to the rate of progress of the sequential raster down the image on the film. As the speed of the film increases, the deflection system 3 uses information from the memory 7 to maintain a constant line rate. The net result of which is that the dot still moves left and right across the face of the CRT but has little movement up and down across the face of the CRT. This is because the movement down the image on the film is provided by the movement of the film past the CRT.

The first problem that results from little deflection vertically on the face of the CRT (sometimes called a small raster "patch") is that the amount of energy fed to the small area of phosphor on the face of the CRT by the electron beam is much higher than normal and can permanently reduce the emissivity of the phosphor in that area ("burning" it) if it is used for long. Not only does this reduce the brightness of the CRT and the signal to noise ratio but when a larger raster patch is required the smaller burnt area will appear in the middle of the video image.

The second problem is that, even if no permanent damage is done the quality of the image may suffer from phosphor grain. The phosphor on the face of the CRT is not perfectly uniform and results in low level variations in signal amplitude in the converted video. Obviously the CRT is designed and manufactured to keep this effect at an acceptable level in normal use. If a small raster is used any small irregularities along the narrow patch will be illuminated by the dot on a number of adjacent lines and in the extreme case of a single line raster, on every line in the image. This smears the grain pattern in the small raster vertically across the image, making it much more objectionable than when a normal sized raster patch is used.

A solution to these problems is disclosed in U.S. Pat. No. 5,179,314 which utilizes a sophisticated scan generator and a temporary storage apparatus to perform a non-sequential scanning method so as to maintain a more uniform screen luminescence. This solution requires significant hardware alterations which are expensive.

SUMMARY OF THE INVENTION

It is an object of the present invention to reduce the above problems caused by small raster patches. This is achieved by enhancing the flexibility of anti-alias and interpolation apparatuses already incorporated into some film transfer apparatuses to perform vertical anti-aliasing.

The problems associated with small raster patches do not affect CCD arrays. When a CCD line array is used the vertical scan is normally achieved by the movement of the film. However, vertical aliasing will affect both CRT and CCD-based systems. If the spot size (or in the case of a CCD the combined effect of the sensor area and the focusing) is too big the horizontal scanned lines across the image will overlap resulting in a vertically soft image. If it is too small it will result in vertical aliasing. In fact the spot size and intensity distribution determines the bandwidth of the signal that is sampled by the line structure. According to Nyquist any signal energy at frequencies above half the sample rate (in this case the line rate associated with the vertical scan of the image) will be aliased. In practice the intensity distribution of the spot cannot be tightly controlled to produce a frequency response with the fast roll off that is desirable to eliminate aliasing while maintaining as wide a pass band as possible. Because of this telecine machines are often operated with visible aliasing rather than suffer the image softening that results from larger spot sizes. FIG. 3 shows how vertical aliasing occurs when energy above the Nyquist rate is sampled, for example when using a very small spot size. It also shows how this can be minimized by use of an anti-aliasing filter.

In a flying spot telecine machine it is normal to scan the film with more lines than are used to produce the video output. These extra lines can be used to "oversample" the required image allowing vertical anti-aliasing to be carried out. In a conventional flying spot system the line rate is fixed and as a result the number of lines that are available for oversampling varies with the film speed. In a CCD-based system the vertical scanning may be achieved solely by the motion of the film. The horizontal scan rate will be proportional to the film speed. Because there will be a practical limit to the scan rate of the CCD, a higher degree of oversampling will be possible at low film speeds than higher ones.

It is another object of the present invention to make the maximum possible reduction in the amount of vertical aliasing visible at the output of the film transfer apparatus at any chosen film speed.

Aperture correction is a process commonly used in video equipment to increase either the actual or subjective sharpness of an image. The term aperture refers to the effective averaging or smearing of the image that limits its resolution. In a conventional flying spot telecine machine the vertical aperture is dominated by the spot size. Horizontally it is typically limited by the spot size, the analog signal processing bandwidth or the horizontal anti-aliasing filters used in the analog to digital conversion process. It is also possible that the film camera may be the limiting factor of sharpnesss. The aim of aperture correction is to optimize the image by compensating for the overall aperture. Often an image is overcompensated either to allow for further aperture distortion in subsequent processing or because subjectively the resultant image looks sharper. Equipment designed for subjective effects often use non-linear processing for example to allow small transitions to be enhanced more than larger transitions. FIG. 4 shows the effect on a sampled signal after processing using varying degrees of aperture correction.

There are a number of problems associated with vertical aperture correction of an interlaced video signal. In general the two interlaced fields that form a frame of video cannot be assumed to relate to the same instant in time. A video camera will typically record each field in turn. A telecine machine of the type described here may produce variable numbers of video fields from each film frame to compensate for differences between the film and television frame rates. Because of this aperture correctors often use only the lines contained in a single video field and this sort of vertical aperture correction is a relatively coarse process as any correction filter can only have taps on every other scanned line.

The effect of aperture correction in the frequency domain is to boost medium and/or high frequencies, which can, if done to excess (e.g. for subjective effect), increase the amount of aliasing and/or high frequency noise. This is particularly true in the case where, for economic reasons, the filters used for aperture correction are relatively simple with few taps and as a result have a poorly defined frequency response.

It is a further object of the invention to overcome the above mentioned problems relating to aperture correction.

Accordingly the present invention provides film to video transfer apparatus comprising a signal processor receiving, a plurality of input raster lines representing a film image, and control means operating on the signal processor whereby the number of the input raster lines used by the signal processor in the active raster to generate a video output signal is variable through a range. By varying the size of the active raster the degree of oversampling can be controlled, for example, so as to obtain the maximum reduction in vertical aliasing at a given film speed.

More particularly, the number of lines in the active raster are variable for any given aspect ratio or standard of the output video picture.

The apparatus may further comprise scanning means for sequentially scanning a film to generate the plurality of raster lines and a scan generator for adjusting the size of the raster produced by the scanning means.

The scanning means may comprise a CRT and the scan generator may comprise deflection apparatus, the control means operating automatically, or allowing user adjustment of the active raster size. The size of a raster patch on the face of a CRT can be maintained above a predetermined minimum.

The scanning means may comprise a CCD and control circuitry therefor, the control means operating automatically or allowing user adjustment of the active raster size. A maximum degree of oversampling can thereby be maintained at varying film speeds.

The signal processor may comprise filtering means for interpolating or otherwise decimating said raster lines.

In an embodiment the signal processor comprises an anti-alias filter device. The anti-alias filter device may have a variable band width which may be adjusted automatically by the control means in response to a variation in the number of raster lines in the active raster. In this embodiment, the degree of oversampling and hence the size of the raster used to scan the film may be altered without affecting the sharpness of the video image or the amount of visible aliasing.

The control means may be operative to adjust the number of lines in the active raster and the bandwidth of the anti-aliasing filter so as to maintain the bandwidth of the video signal generated. This arrangement allows the operator to vary the degree of oversampling whilst the vertical size of the video output raster is maintained.

In an embodiment the signal processor comprises an aperture correction device. The bandwidth of the anti-alias filter may be variable depending on the degree of aperture correction applied.

The invention also provides a method of generating a video signal in a film to video transfer operation, comprising scanning an image on a film to generate an input signal having a greater number of input raster lines than are required for the ultimate video raster, processing these input raster lines by an interpolation or other decimation process to produce said video raster, the number of input raster lines used in said decimation process being variable.

The invention will now be described in more detail and with reference to the accompanying drawings, in which.

DESCRIPTION OF THE PREFERRED EMBODIMENTS

Figure 8:
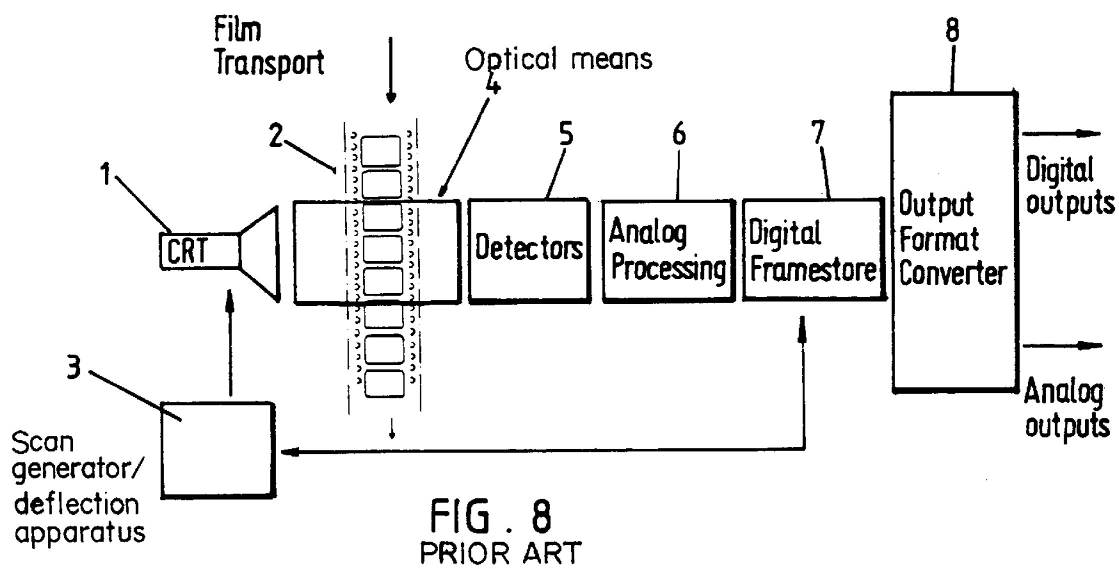
FIG. 8 is a block diagram of a conventional 'flying spot' telecine machine.

In a conventional flying spot telecine machine as shown in FIG. 8, a deflection system 3 controls the electron beam in a CRT 1 to produce a dot of light from the phosphor on the face of the tube. The beam and hence the dot is deflected to follow a raster on the face of the tube. The light from the dot is processed by optics 4 to form a beam that passes through a film 2 and it is then split into its green, blue and red components which are detected by detector 5 comprising an array of photocells. These photocells produce electrical signals which are amplified by analog processor 6 before being converted to a digital representation and stored in the digital memory or framestore 7. The deflection system 3 controls the path of the dot to compensate for the linear motion of the film 2; if the film speed is set at a higher speed the size of the raster patch is changed whilst maintaining a constant line rate.

Figure 2:
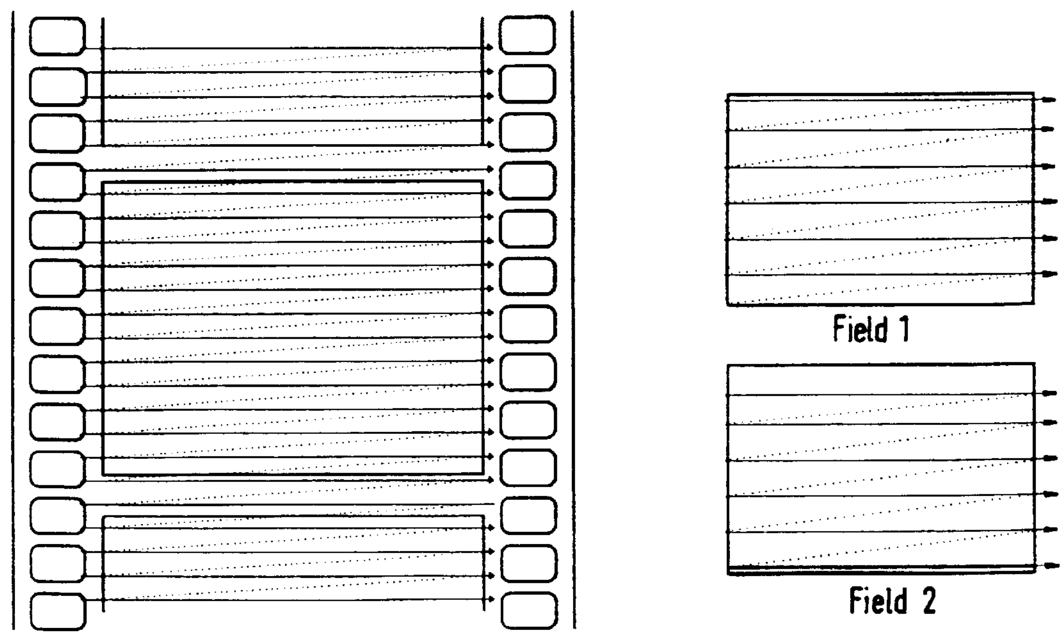
FIG. 2 shows how the lines of a sequential raster produced by scanning a film frame are used to form two interlaced fields for television.
Figure 3:
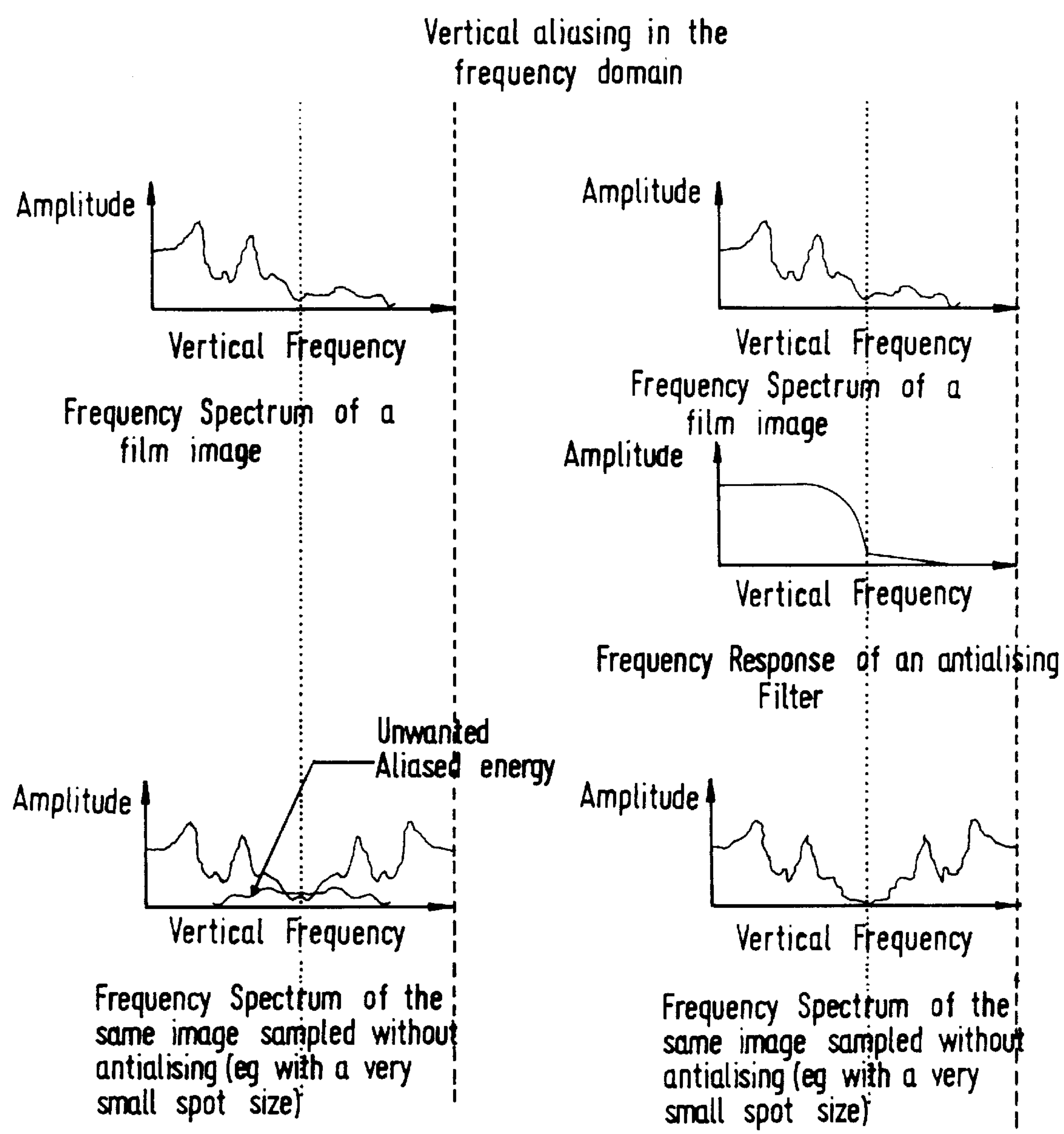
FIG. 3 shows graphically the frequency spectrum of a film image before and after sampling with and without anti-alias filtering and also the frequency response of a typical anti-alias filter.
Figure 4:
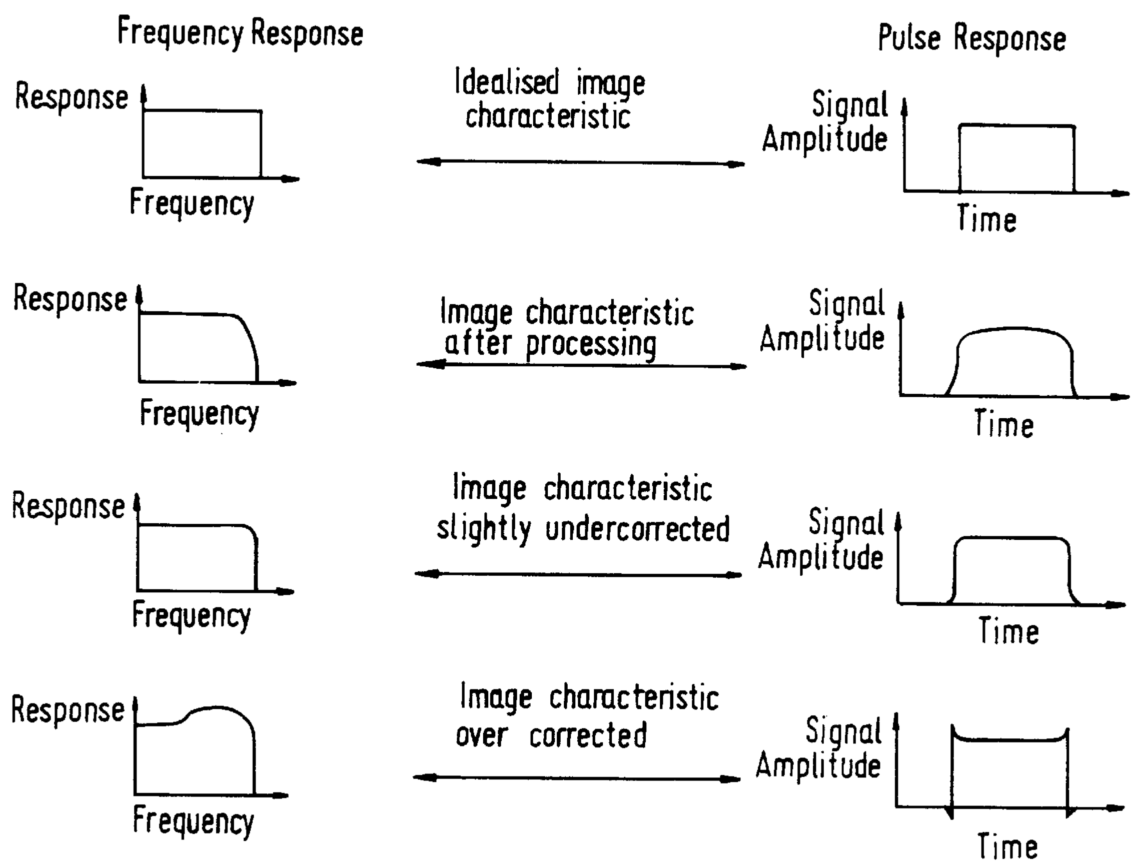
FIG. 4 shows how aperture correction can be used to compensate for signal processing degradations or to produce a subjective improvement in perceived sharpness by over-correction.

In the arrangement shown in FIG. 8 the signal produced is a sequential raster as shown in FIG. 2. The film is scanned once with a sequential raster. Alternate lines from this raster are used to produce a pair of interlaced television fields.

More lines of the film are scanned than are actually used to form the video image.

Figure 7:
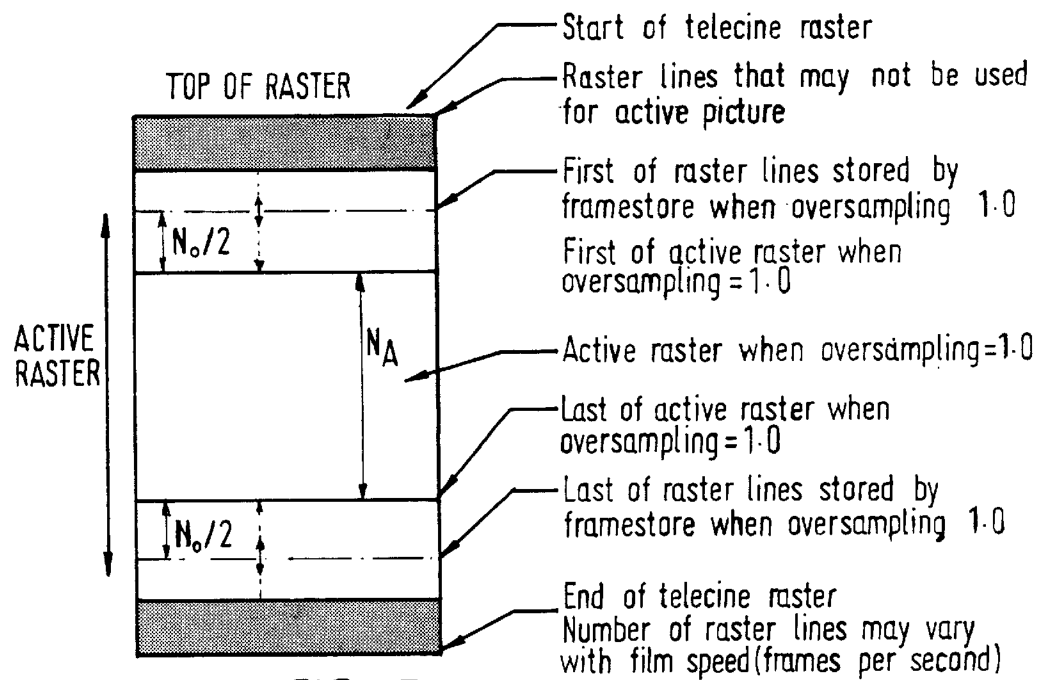
FIG. 7 is a diagram of the raster produced by an embodiment of the invention, and indicates how it differs from a conventional machine with no oversampling.

A scanning apparatus and method according to the invention employing a variable degree of vertical oversampling minimizes vertical aliasing and in the case of flying spot telecine machines allows a more uniform illumination of the cathode ray tube to be maintained. The scanning apparatus scans the image on the film with a variable number of (extra) raster lines compared to those required in the television (video) image. FIG. 7 shows diagrammatically the components of a typical telecine raster. The two dark bands at each extreme represent those lines in the raster that cannot be used for practical reasons due to hardware limitations for example. The line $N_A$ represents the band of the raster lines which are used in a conventional telecine machine to form the active raster and corresponds to an oversampling ratio of 1.0. Either side of this band are a variable number of lines $N_0/2$ (for example) which may be used by the apparatus of the present invention, up to the practical limit of the hardware. The active raster corresponds to those lines of the scanning raster that are used by the processing apparatus to produce the output video picture. The extent of these lines relative to the film must be the same as the required image on the film. The relative size of the film image is set by the deflection apparatus.

Preferably the degree of oversampling is maintained to give an oversampling ratio above 1.0. There may be any number of different degrees of oversampling within the limits of the hardware constraints. Typically there will be at least 4 different degrees of oversampling, more particularly the number of degrees of oversampling may be in the range 12 to 256.

In an embodiment the apparatus includes interpolation and anti-alias filters and allows control of the degree of oversampling by an operator or by some other automatic means. An anti-alias filter is used to remove vertical frequencies that will be aliased by the sampling process that is inherent in the discrete lines that form the television raster. An interpolation filter is then used to produce the number of lines required to form a television image. Because interpolation and anti-alias filters are normally linear processes a single filter could be used to carry out these processes.

The apparatus described also includes aperture correction apparatus operating before or after the interpolation process. Because some aperture correctors are linear processes the aperture correction can be carried out using the same filter used for anti-aliasing and interpolation, having exactly the same effect as each of the three processes carried out in cascade.

One problem with providing a variable degree of oversampling is that the effective bandwidth of the television (video) signal is proportional to the degree of oversampling as the anti-alias filter must operate on the non-interpolated raster used to scan the film to prevent aliasing. In view of this the control apparatus may include means to alter the bandwidth of the anti-alias filter, positioned before the interpolator, to compensate for this effect. It may also include means to alter the bandwidth of any other filters positioned before the interpolator, for example a linear aperture correction process implemented with the anti-alias and interpolation processes in a single filter.

The control apparatus may also modify the bandwidth of the anti-alias filter as a function of the degree of aperture correction being used, to minimise the increase in high frequency noise.

In a flying spot telecine machine, altering the amount of oversampling used will change the size of the raster patch for a given ratio of image sizes on film and video. This change in raster size may be achieved by manual or automatic control of the deflection apparatus.

The change in raster size associated with the change in degree of oversampling allows acceptable raster patch sizes to be selected in flying spot systems at film speeds and image sizes that would otherwise result in small raster patches. Normally in a flying spot telecine machine the size of the raster patch falls as the film speed increases, until it falls to a single line, (very undesirable) after which it starts to grow again (the raster is now crossing the face of the CRT in the opposite direction to before). To gain the anti-aliasing benefits of oversampling the preferred embodiment would operate with a medium level of oversampling, for example an oversampling ratio of 1.0–2.0. At film speeds that would result in a small raster patch the degree of oversampling could be reduced or increased as appropriate to increase the size of the corresponding raster patch.

The degree of oversampling can be changed as a function of film speed either manually or by automatic means. By maintaining the size of the raster patch above a predetermined minimum a reduction in CRT burn and in image degradation due to phosphor grain can be obtained.

Figure 1:
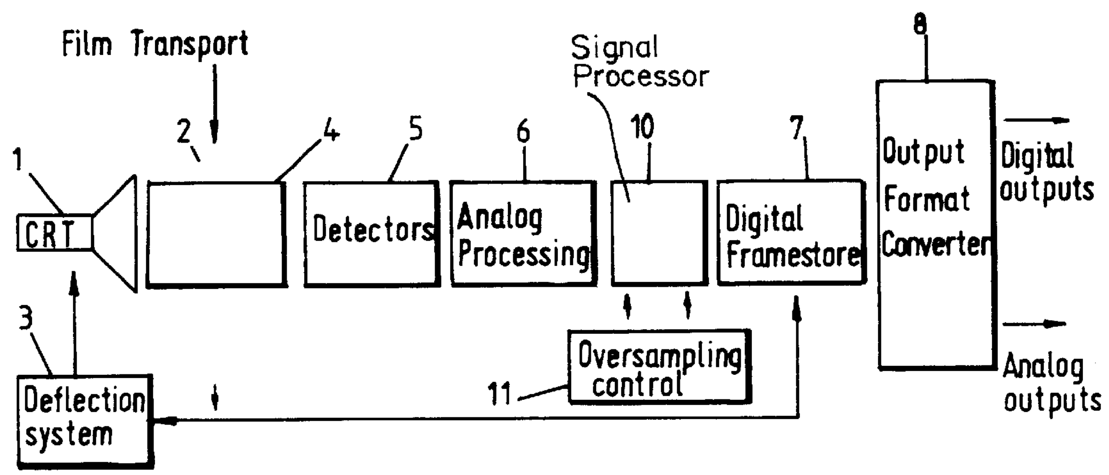
FIG. 1 shows the main signal processing blocks used in a flying spot telecine machine according to the invention.

A film to video transfer system according to the present invention uses a scanning apparatus as shown in FIG. 1 or a CCD array based system to produce a sequential raster scanned signal. The size of the raster projected onto the image on the film is reduced by a variable amount (the degree of oversampling), by the deflection system or in the case of a CCD system the CCD control circuitry. This increases the number of the raster lines that scan the required image area by the degree of oversampling. When the size of the raster projected onto the film image is reduced in this way, the size of the raster in a flying spot telecine machine is increased or decreased depending on the film speed. By increasing the number of lines that scan the image in this way and by anti-alias filtering and interpolation, vertical aliasing can be reduced. Conversely, this method can be used to maintain a minimum raster size by controlling the size of the raster patch on the face of the CRT.

In FIG. 1, like parts are designated by identical reference numerals as in FIG. 8.

The signals produced by the conventional analog processing unit 6 are fed to a filtering device of the present invention designated as signal processor 10 in FIG. 1. The filtering device operates under the control device 11. Signal processor 10 and control device 11 are shown in more detail in FIG. 5. The green, blue and red signals are processed by anti-alias and interpolation filters 12. The embodiment of FIG. 5 also includes aperture correction filters 13. These various filters may or may not be linear, but in the case that two or more are linear their functions may be combined and performed by a single filter.

Figure 5:
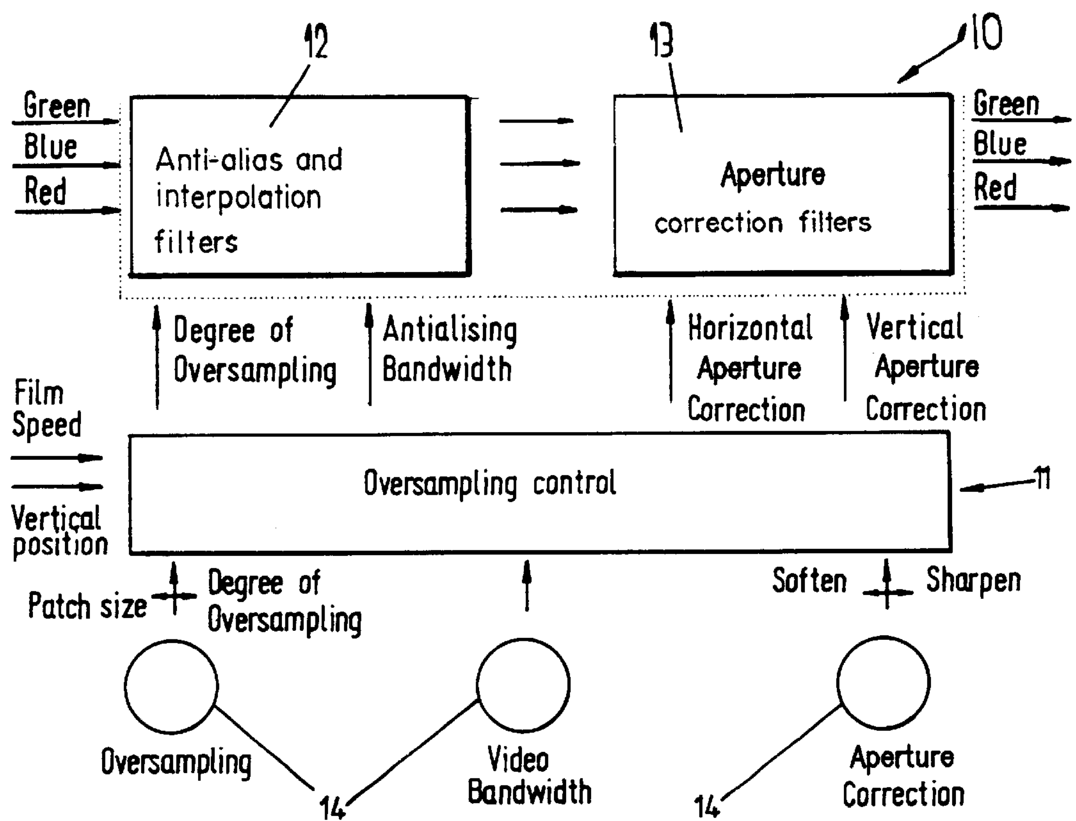
FIG. 5 is a block diagram of the filter device and control apparatus of an embodiment.

FIG. 5 shows the signal processor 10 and a control unit 11. The control unit 11 comprises means for use by an operator to enable selection of various parameters of the filter device. In the present embodiment, Controls 14 are shown for selecting the degree of oversampling, the bandwidth of the video output and the degree of aperture correction. In alternate embodiments, one or more of these parameters can be set automatically, for instance, in the case of the degree of oversampling, this might be automatically controlled, based on the speed of the film, so as to maintain the size of the raster patch on CRT tube 1 greater than a predetermined minimum. Indeed there may be some degree of automatic compensation of various parameters, such as degree of deflection in relation to film speed and/or degree of oversampling, together with a manual override option.

Figure 6:
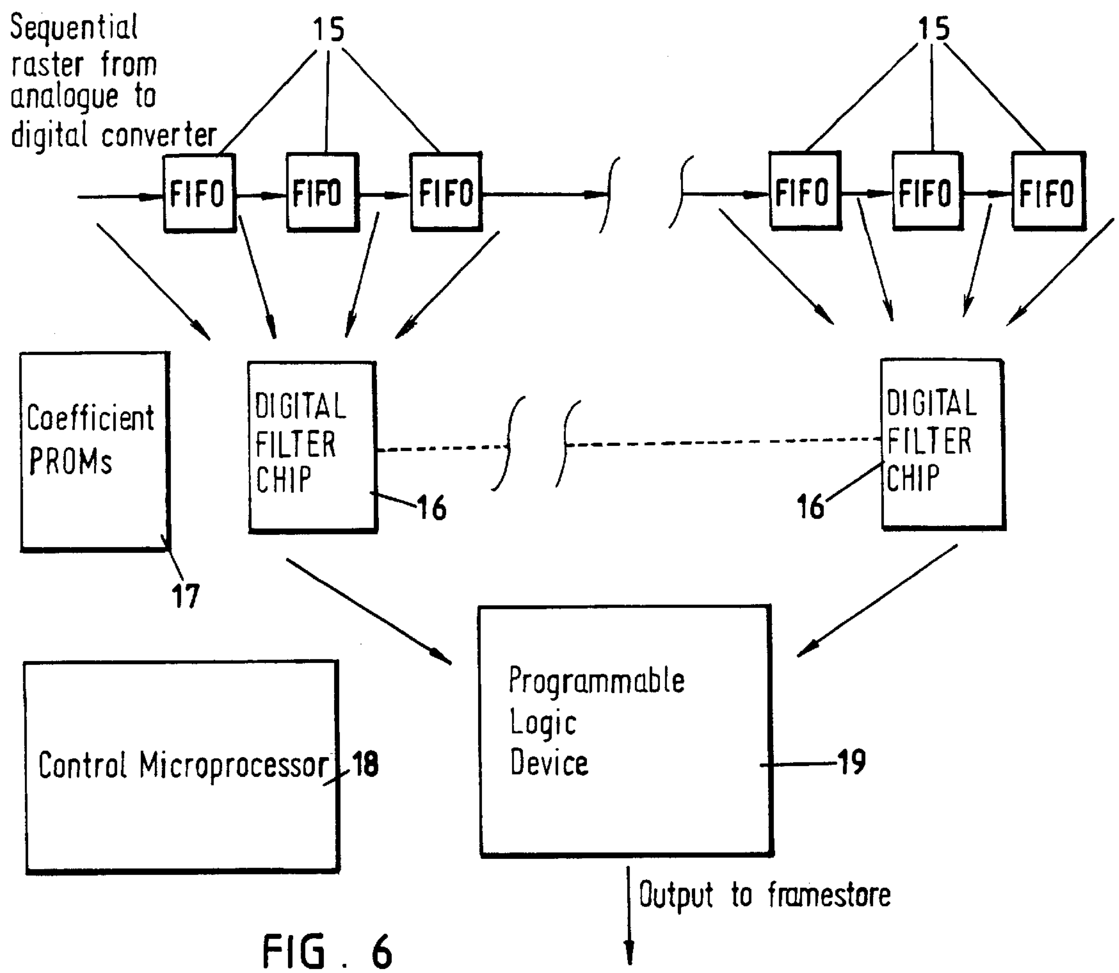
FIG. 6 is a block diagram of the filter and control circuits of the apparatus of FIG. 5.

In an embodiment a system with a variable degree of oversampling may be used with a TK1440 framestore (Available from Tekniche Limited) installed in a flying spot telecine machine. This particular embodiment of the invention is described below with reference to FIG. 6 which shows a block diagram of the circuit filter and control circuit. In this embodiment the interpolation and anti-alias filters 12 are combined into a single, one dimensional (vertical) FIR filter using a number of commercially available UPD485506 first in first out (FIFO) memory chips 15 (as telecine line delays) and LF2247 digital filter chips 16 with built in coefficient stores.

At any one instant the outputs from the cascaded FIFOs provide data samples along a vertical line in the active telecine raster. The interpolation filter operates on these samples and interpolates a single output sample at one of a number of positions, typically 16 to 128, between a pair of input lines. The coefficients for each of the possible output line positions and the currently selected anti-aliasing bandwidth are transferred from a "programmable read only memory" (PROM) 17 to the filter chips 16 during the beginning of the telecine raster (the grey area shown in FIG. 7, which is discussed below that is never used for the active raster). During the blanking at the start of each line of the active telecine raster, a microprocessor 18 selects the coefficients to be used by the filter chips 16 for the current output line. In a system with a fixed degree of oversampling the microprocessor would step through the coefficient addresses at a constant rate. To implement a variable degree of oversampling the microprocessor 18 steps through the interpolation coefficient sets at a rate that is proportional to the currently selected oversampling ratio. The microprocessor 18 also inhibits writing to the store when there is no video line being produced because there are fewer output video lines than scanned lines.

The output from the filter chips 16 are fed to a commercially available EPF81188 programmable logic device 19. The logic device 19 is programmed to sum the outputs from the filter chips 16 to achieve a finite impulse response (FIR) filter having the desired number of filter taps, typically 4 to 64. The adder is followed by an aperture correction device. The techniques for aperture correction are well known and are discussed, for example, in BBC Research Department Reports "A study of high order aperture correction" (RD 1973/36) and "A digital telecine processing channel" (RD 1978/9).

The microprocessor 18 also reads the user adjustments for oversampling, bandwidth, aperture correction and film frame rate. The microprocessor 18 can make the automatic adjustments to anti-alias bandwidth and degree of oversampling that have been described. The present embodiment does not control the deflection apparatus automatically; this is done under operator control. The technical means and method of implementing automatic control of a deflection apparatus are well known to the man skilled in the field of telecine systems.

The anti-aliasing filter is conventionally a low pass filter. It may have a fixed bandwidth, but in an embodiment of the invention it has an adjustable bandwidth. To perform its function it must be placed before the interpolation filter, but may be combined with that filter.

In an embodiment of the invention the bandwidth of the anti-alias filter is reduced as the reciprocal of the oversampling ratio so that the vertical bandwidth of the video signal (measured in cycles per frame) does not increase as the oversampling ratio is increased.

The aperture correction filters 13 may be vertical, horizontal or two dimensional in design and may have linear or non-linear transfer functions. In the case where they are linear they may be combined with the anti-alias and interpolation filters 12. In the embodiment shown in FIG. 5 they are non-linear and follow the interpolation filters.

The interpolation filter uses the signal amplitudes at an array of points in the scanned raster to produce the amplitude for a point on the video raster. In the preferred embodiment of the invention the array of points used for interpolation form a vertical line, but a two dimensional array may be used. The preferred embodiment of the oversampling control apparatus 11 has operator control of the degree of oversampling (and hence at any given film speed the patch size), the video bandwidth, and aperture correction. The controller may then modify the degree of oversampling to allow for practical limitations such as the maximum number of raster lines at the current film speed. It controls the anti-alias bandwidth as a function of the video bandwidth requested by the user, the degree of oversampling and the amount of aperture correction in use.

The raster scanning apparatus and method of the present invention employs vertical oversampling (in that it forms the required image lines from a variably larger number of scanned lines), reduces vertical aliasing, and maintains a more uniform illumination of the cathode ray tube.

Also disclosed is an apparatus and method for controlling the vertical anti-aliasing bandwidth according to the degree of oversampling, aperture correction and other operating parameters such as film speed to optimize the alias and noise performance of the telecine machine.

The film may be scanned with either a sequential or interlaced raster, or even a random scan which is reassembled into a sequential scan before being processed by the signal processor of the invention.

The control apparatus may be manipulated by the operator to maintain a minimum size of raster patch by adjusting the amount of oversampling or the apparatus may use parameters such as the film speed to achieve this automatically. This control apparatus may also control the characteristics of the anti-alias and aperture correction filters. It may automatically modify the bandwidth of the anti-alias filters to maintain a constant vertical frequency response in the video raster as the amount of oversampling is adjusted.

To allow a simpler (possibly non-linear) aperture correction filter to be used with less unwanted aliasing and/or noise when high levels of correction are used for subjective effect, the control apparatus may reduce the bandwidth of the anti-alias filters as a function of the degree of aperture correction in use. The multidimensional control functions described may take the form of mathematical relationships calculated in a computer or by a lookup table.

We claim:

1. Film to video transfer apparatus comprising a signal processor receiving a plurality of input raster lines representing a film image, and control means operating on said signal processor whereby the number of said input raster lines used by the signal processor in the active raster to generate a video output signal is variable through a range.

2. Film to video transfer apparatus as claimed in claim 1, wherein the number of lines used in the active raster varies for a given aspect ratio of the output video picture.

3. Film to video transfer apparatus as claimed in claim 1, wherein the number of raster lines used in the active raster is variable for a given output video standard.

4. Film to video transfer apparatus as claimed in claim 1, and further comprising scanning means for sequentially scanning a film to generate said plurality of raster lines.

5. Film to video transfer apparatus as claimed in claim 4, wherein the apparatus further comprises a scan generator for adjusting the size of the raster produced by the scanning means.

6. Film to video transfer apparatus as claimed in claim 5, wherein the scan generator comprises deflection apparatus and the control means operates automatically, or allows user adjustment of the active raster size.

7. Film to video transfer apparatus as claimed in claim 5, wherein the scan generator comprises CCD control circuitry and the control means operates automatically or allows user adjustment of the active raster size.

8. Film to video transfer apparatus as claimed in claim 1, wherein the signal processor comprises filtering means for interpolating or otherwise decimating said raster lines.

9. Film to video transfer apparatus as claimed in claim 1, wherein said signal processor comprises an anti-alias filter device.

10. Film to video transfer apparatus as claimed in claim 9, wherein said anti-alias filter device has a variable band width.

11. Film to video transfer apparatus as claimed in claim 10, wherein the band width of the anti-aliasing filter is adjusted automatically by the control means in response to a variation in the number of raster lines in the active raster.

12. Film to video transfer apparatus as claimed in claim 10, wherein the control means is operative to adjust the number of lines in the active raster and the bandwidth of the anti-aliasing filter so as to maintain the bandwidth of the video signal generated.

13. Film to video transfer apparatus as claimed in claim 10, wherein said signal processor comprises an aperture correction device.

14. Film to video transfer apparatus as claimed in claim 13, wherein the bandwidth or the anti-alias filter is variable depending on the degree of aperture correction applied.

15. A method of generating a video signal in a film to video transfer operation, comprising scanning an image on a film to generate an input signal having a greater number of input raster lines than are required for the ultimate video raster, processing these input raster lines by an interpolation or other decimation process to produce said video raster, the number of input raster lines used in said decimation process being variable through a range.

16. A method of generating a video signal in a film to video transfer operation as claimed in claim 15, wherein the number of lines used in the active video raster varies for a given aspect ratio of the output video picture.

17. A method of generating a video signal in a film to video transfer operation as claimed in claim 15, wherein the number of lines used in the active video raster varies for a given output video standard.

18. A method of generating a video signal as claimed in claim 15, comprising a step of anti-alias filtering before said decimation processing.

19. A method of generating a video signal as claimed in claim 16, wherein the band width of the anti-alias filtering is variable.

* * * * *